Feb. 13, 1951     G. M. VERLEY     2,541,795
CATALYTIC CRACKING OF HYDROCARBONS
Filed June 18, 1947
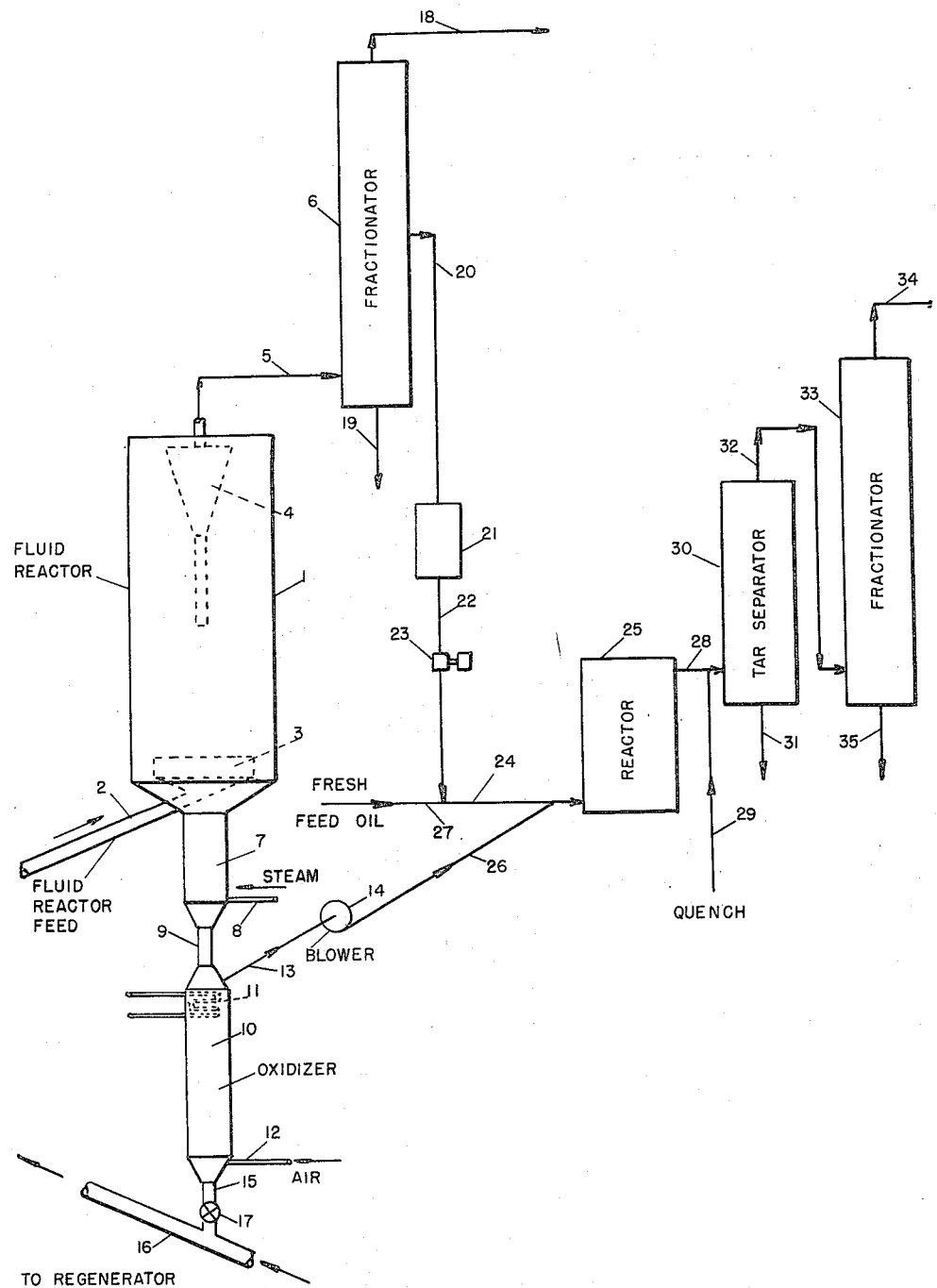
INVENTOR
GUY MARIE VERLEY
BY
Pennie, Edmonds, Morton & Barrows.
ATTORNEYS Patented Feb. 13, 1951

2,541,795

UNITED STATES PATENT OFFICE 2,541,795

CATALYTIC CRACKING OF HYDROCARBONS

Guy Marie Verley, Chicago, Ill., assignor to Sinclair Refining Company, New York, N. Y., a corporation of Maine Application June 18, 1947, Serial No. 755,454

1 Claim. (Cl. 196—49)

This invention relates to the pyrolytic conversion of hydrocarbons and, more particularly, to the pyrolytic conversion of hydrocarbons in the presence of a catalyst.

The invention is especially applicable to conversion processes of the general type wherein a finely divided powdered, granular, or pelleted catalyst is intimately contacted with hydrocarbons to be converted in a reaction zone, spent catalyst is stripped of readily vaporizable hydrocarbons, regenerated, and again intimately contacted with further hydrocarbons to be converted. The invention is applicable to catalytic conversion processes of the type described wherein the catalyst is used either as a fixed bed, a moving bed, or in a fluidized condition, as in the so-called fluid catalyst process.

In catalytic processes such as described, the hydrocarbons absorbed in and adsorbed on the catalyst are ordinarily not completely removed by the stripping. Usually there remains on the catalyst after the stripping operation a substantial amount of heavier, more closely held vaporizable hydrocarbons which are normally burned off in the regenerating operation.

In accordance with my present invention, I use a substantial proportion of these residual hydrocarbons normally burned in the regeneration of the heterogeneous catalyst in the production of a homogeneous catalyst which I have found especially effective in selectively catalyzing the cracking of hydrocarbon fractions containing straight-chain paraffinics.

In my copending application Ser. No. 755,453, filed concurrently herewith, I have described and claimed a process in which the homogeneous catalyst is produced by passing a controlled amount of air in contact with the spent heterogeneous catalyst from a hydrocarbon conversion process and containing substantial proportions of vaporizable hydrocarbon, while maintaining the heterogeneous catalyst and hydrocarbons thereon at a temperature within the range of 300° to 750° F., and admixing the resultant oxidized hydrocarbons with hydrocarbon vapors undergoing conversion in contact with the heterogeneous catalyst.

The process there described is especially applicable to catalytic cracking processes employing heterogeneous catalysts of the conventional types and in which an intermediate insufficiently cracked fraction of the resultant vapors is recycled to the process for further cracking in contact with the solid catalyst and in admixture with fresh charging stock.

The present process constitutes an improvement in the operation of my copending application just described, according to which the homogeneous catalyst prepared by the partial oxidation of hydrocarbons on the spent solid catalyst is used in the cracking of such intermediate fraction, or other refractory stock containing straight-chain paraffins, in a zone separate from the heterogeneous catalyst cycle.

My present process has the advantage of cracking the more refractory stock under conditions especially adapted to the cracking of said more refractory stock and permitting the operation of the heterogeneous catalyst cycle under conditions best suited to the cracking of the fresh, less refractory stock charged thereto.

The more refractory stock charged to the homogeneous catalyst operation may consist solely of an intermediate fraction from the heterogeneous catalyst cycle or such fraction may be cracked in admixture with a fraction from an extraneous source. The invention also contemplates the cracking of a refractory fraction from an extraneous source as the sole charge to the homogeneous catalyst cracking step.

I have found that the cracking rates of non-branched or straight-chain paraffins are lower than the cracking rates of highly branched paraffins, under similar conditions of temperature and pressure, and that the former tends to result in gasoline of low octane value.

I have further found that the presence of partially oxidized hydrocarbons in the cracking reaction zone materially increases the over-all cracking rate and that the increase in cracking rate is different for different types of hydrocarbons, the cracking rate of straight-chain paraffins being substantially increased relative to the cracking rate of branched-chain paraffins by the presence of a homogeneous catalyst consisting essentially of partially oxidized hydrocarbons.

The intermediate fraction separated from the effluent vapors from heterogeneous cracking operations, such as just described, normally contains substantial proportions of more refractory paraffinics as well as substantial proportions of aromatics and branched-chain paraffinics. It is desirable to effect a more severe cracking of the straight-chain paraffin constituents than of the less refractory constituents in order to produce a gasoline of high anti-knock characteristics.

The present invention provides an improved process adapted to either continuous or discontinuous operation and comprising a plurality of cooperating steps so coordinated as to constitute a unitary operation in which an improved yield of gasoline of high anti-knock characteristics is obtained.

Though the invention, as previously noted, is applicable to various types of catalyst processes employing solid catalysts, it will be more fully described and illustrated with reference to the accompanying drawing which represents, conventionally and somewhat diagrammatically, a flow diagram of a fluid catalyst cracking process embodying my invention and which may be used with particular advantage.

In the drawing, the apparatus indicated by the reference numeral 1 represents a generally cylindrical fluid catalyst reactor of conventional type. The finely divided fluid catalyst suspended in oil vapors to be converted enters the reactor through conduit 2 extending into the reactor and terminating in a conical member 3 of somewhat smaller diameter than the reactor and opening upwardly into the reactor through a conventional grid, not shown.

As the hot vapors pass upwardly through the reactor, there is a tendency for the catalyst to drop out of suspension forming a so-called "high density" or "dense phase" body of catalyst in the reactor, which flows downwardly through the annular space between the conical member 3 and the walls of the reactor.

Oil vapors, products of the conversion, rise to the top of the reactor, pass through a cyclone type separator 4 to remove suspended catalyst from the vapors, the latter passing through line 5 to conventional fractionating apparatus 6 and the separated catalyst dropping back into the dense phase body of catalyst in the reactor.

Spent catalyst flows from the lower end of the reactor into stripping column 7 and gravitates downwardly therethrough countercurrent to a rising stream of steam, or other gaseous stripping medium introduced through line 8. Stripped catalyst, still containing a substantial amount of vaporizable hydrocarbons, passes from the lower end of the stripper through conduit 9 into the upper end of the oxidizer 10.

The catalyst entering the oxidizer is cooled to a temperature below that temperature at which cracking of oxidized hydrocarbons begins advantageously to a temperature within the range of 300° to 750° F., by contact with cooling coils 11 and passes downwardly through the oxidizer in a relatively dense phase countercurrent to a stream of air introduced into the lower part of the oxidizer through line 12.

In passing downwardly through the oxidizer, the hydrocarbons deposited on the spent catalyst which escaped vaporization in the stripper are partially oxidized by contact with the rising air, are vaporized and withdrawn from the upper zone of the oxidizer through line 13 by means of blower 14. Means suitable for separating the vapors of the oxidized hydrocarbons from the catalyst are available and need not here be described.

The catalyst passes from the bottom of the oxidizer through spent catalyst leg 15 into the lower end of conduit 16, the rate of flow of the catalyst being controlled by valve 17, advantageously a conventional slide valve.

The catalyst is caught up in suspension in conduit 16 by a current of air, or other oxidizing gas, and carried thereby in suspension to a regenerator in which the catalyst is regenerated in the conventional manner and from which the catalyst is returned in suspension in hydrocarbon vapors to be converted to the reactor through conduit 2, as previously described.

The amount of air passed to the oxidizer will depend primarily upon the amount and nature of the hydrocarbons absorbed in, or adsorbed on, the catalyst passing from the stripper and also upon the temperature maintained in the oxidizer. The amount of air will thus depend largely upon stripping efficiency. In general, the stripping efficiency should be such as to leave on the catalyst a substantial amount of hydrocarbon of such nature that the oxidation products will readily vaporize under the oxidizing conditions. In general, the amount of air passed to the oxidizer should be such that the molecular ratio of oxygen to hydrocarbon on the catalyst is within the range of 0.5:1 to 2:1.

The temperature of the oxidizing zone should be maintained, as previously noted, below the cracking temperature of the hydrocarbon deposited on the catalyst but high enough to effect a relatively rapid oxidation of the hydrocarbons. In general, the temperature should be maintained within the range of 300° to 750° F.

To avoid excess temperature in the oxidation zone, the cooling coil 11 may be supplemented where desirable by other heat extracting means, additional cooling coil, for instance, in the intermediate or lower zones of the oxidizer. The temperature in the oxidizing zone may also be controlled to a considerable extent by regulation of the proportion of air to catalyst passed therethrough.

In the fractionator, previously noted, the vapors from the fluid reactor are fractionated to form a lower boiling fraction containing hydrocarbons within the desired boiling range, which is withdrawn from the upper portion of the fractionator through line 18. A heavier hydrocarbon fraction is withdrawn through the bottom of the fractionator through line 19 and an intermediate fraction, of the type ordinarily constituting recycled stock, is withdrawn from an intermediate portion of the fractionator through line 20 and passes to surge tank 21 from which it is withdrawn through line 22 and by means of pump 23 is forced through line 24 to the reactor 25.

In line 24, the intermediate stock is mixed with the partially oxidized hydrocarbons, passed thereto through line 26, and the mixture charged to the reaction zone and heated therein to the cracking temperature of the intermediate fraction within the range of 850° to 1,100° F. for a period of time sufficient to effect substantial cracking of the fraction.

It is frequently desirable to supplement the intermediate fraction passing to the reactor 25 by other hydrocarbon fractions of a like, or somewhat different nature. Such supplemental stock may be charged to line 24 through line 27. In some instances, it may be found desirable or necessary to discontinue the charge of the intermediate fraction and to pass only the feed stock introduced through line 27 in admixture with the oxidized hydrocarbons to the reactor 25.

The reactor 25 is, with advantage, of the conventional coil cracker type adapted to heat the oil to the desired temperature at atmospheric or super-atmospheric pressure.

The hydrocarbon to be cracked and the homogeneous catalyst introduced through line 24 pass through the reactor as a homogeneous mixture and pass therefrom through line 28 in which they are mixed with a relatively cool hydrocarbon quench oil introduced through line 29, whereby the effluent from the cracking reactor is rapidly cooled to a temperature at which active cracking ceases, usually below 750° F. and advantageously within the range of 600° to 750° F. The quenching medium may be a water spray, saturated low pressure steam, or a hydrocarbon oil, a reduced crude, for instance, or other suitable stock.

The mixture of cracking reactor effluent and quenching medium is passed to tar separator 30 in which lighter hydrocarbons are separated as vapors from the heavier, unvaporized hydrocarbon, the latter being withdrawn from the tar separator through line 31.

The separated vapors are withdrawn from the tar separator through line 32 and passed to a conventional fractionator 33 from which the lighter hydrocarbons containing the desired fraction are withdrawn through line 34 and further treated, according to conventional practice, and the heavy hydrocarbons are withdrawn through line 35.

The pressure maintained in the oxidizing zone is, with advantage, approximately atmospheric pressure, or only sufficiently higher to permit the free passage of oxidized hydrocarbons in the vapor form from the zone. The pressure in the homogeneous catalyst reactor is subject to considerable variation depending upon the nature of the stock charged thereto, the temperature employed, and the depth of cracking required. Pressures within the range of 1 to 30 pounds per square inch may generally be employed with advantage.

The invention is not restricted to the use of a particular heterogeneous catalyst but is applicable to processes employing any of the conventional solid catalysts, such as natural or synthetic earth type catalyst, silica gel, or the like, for instance, a silica-alumina type catalyst in finely divided, granular or pelleted form.

The reaction conditions in the heterogeneous catalyst cycle may, likewise, be those conventionally used in operations of that type and, as understood by the art, the optimum temperatures and pressures will depend primarily upon the type of feed stock used, the particular catalyst employed, and the reaction desired. In cracking gas oil, for instance, in the heterogeneous catalyst cycle, the reaction temperature, with advantage, may be within the range of 800° to 1,000° F. and the pressure at the top of the reactor within the range of about 5 to 25 pounds per square inch. The regeneration temperature may, for instance, be within the range of 950° to 1,200° F., heat for the heterogeneous catalyst reaction being supplied in large measure by the hot catalyst passing into the charge oil from the regenerator.

Operations of the type described have the advantage of continuous operation. Operations employing moving beds of coarse grain catalyst are also adapted to continuous operation, the spent catalyst passing from the reaction zone being stripped, the hydrocarbons remaining thereon oxidized and the oxidized hydrocarbons continuously passed to the homogeneous catalyst cracking zone.

In the fixed bed heterogeneous catalyst type of operation a plurality of reactors are usually employed so as to avoid interruption of the operation during stripping and regeneration of the catalyst bed. In this type of operation, the residual hydrocarbons on the stripped catalyst are oxidized as described, after cooling somewhat, and the resultant oxidized hydrocarbons either passed directly to the homogeneous catalyst reactor, or passed to storage and used as required.

The proportion of oxidized hydrocarbons to charge oil passed to the homogeneous cracking reactor will depend somewhat upon the proportions of straight-chain paraffins in the oil charged thereto, the depth of cracking and the selectivity of cracking desired. It will also depend somewhat upon the extent of oxidation of the hydrocarbons and the concentration of oxidized hydrocarbons in the mixture, usually proportions of oxidized hydrocarbons within the range of 0.1:1 to 1:1 will be found effective.

I claim:

In a process for preparing lighter, lower boiling hydrocarbons from heavier, higher boiling hydrocarbons, wherein a hydrocarbon fraction containing straight and branched chain paraffins is contacted with a solid catalyst in a reaction zone, the spent catalyst is withdrawn from the reaction zone and stripped of hydrocarbons, the spent catalyst is regenerated and returned to the reaction zone, the hydrocarbon vapors withdrawn from the reaction zone, and fractionated to obtain the desired lower boiling fraction and an intermediate fraction containing straight chain paraffins, the improvement which comprises partially oxidizing the hydrocarbons remaining on the catalyst after partial stripping and prior to regeneration by passing air in contact with the catalyst in such proportion that the molecular ratio of oxygen to the hydrocarbon present on the catalyst is within the range of 0.5:1 to 2.0:1 while maintaining a temperature in the range approximating 300 to 750° F., withdrawing these partially oxidized hydrocarbons from the zone of oxidation, passing them to a second reaction zone and admixing them with the intermediate fraction containing straight chain paraffins from the first reaction zone, heating the mixture in the second reaction zone at a temperature in the range approximating 850 to 1100° F. for a period of time sufficient to substantially crack these fractions, rapidly cooling the effluent from the cracking reaction to a temperature below 750° F. and then fractionating the resultant vapors to obtain additional low-boiling hydrocarbons.

GUY MARIE VERLEY.

REFERENCES CITED

The following references are of record in the file of this patent:

UNITED STATES PATENTS

| Number | Name | Date |
|---|---|---|
| 2,391,434 | McAfee | Dec. 25, 1945 |
| 2,391,944 | Carlsmith | Jan. 1, 1946 |
| 2,428,691 | Tyson | Oct. 7, 1947 |
| 2,430,249 | Ruthruff | Nov. 4, 1947 |